(12) United States Patent
Zhao

(10) Patent No.: US 7,884,572 B2
(45) Date of Patent: Feb. 8, 2011

(54) HOT SPOT DEVICE

(75) Inventor: Yang Zhao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 12/849,024

(22) Filed: Aug. 3, 2010

(65) Prior Publication Data

US 2010/0295512 A1 Nov. 25, 2010

Related U.S. Application Data

(63) Continuation of application No. PCT/CN2010/071510, filed on Apr. 1, 2010.

(30) Foreign Application Priority Data

May 12, 2009 (CN) .................. 2009 1 0141039

(51) Int. Cl.
*H01M 10/46* (2006.01)
(52) U.S. Cl. ...................... 320/107; 455/466
(58) Field of Classification Search ............... 320/107, 320/109; 370/310, 338; 455/39, 439, 440, 455/466
See application file for complete search history.

(56) References Cited

U.S. PATENT DOCUMENTS

| | | | |
|---|---|---|---|
| 6,632,562 B1 * | 10/2003 | Nakatsuka et al. | 429/158 |
| 7,366,149 B2 * | 4/2008 | Maki et al. | 370/338 |
| 2004/0146032 A1 | 7/2004 | Lin | |
| 2005/0058110 A1 | 3/2005 | Lee | |
| 2008/0014934 A1 * | 1/2008 | Balasubramanian et al. | 455/434 |
| 2008/0165780 A1 * | 7/2008 | Aldaz et al. | 370/392 |
| 2009/0015419 A1 | 1/2009 | Sewall | |

FOREIGN PATENT DOCUMENTS

| | | |
|---|---|---|
| CN | 1592435 A | 3/2005 |
| CN | 101562864 A | 10/2009 |
| WO | 2007095544 A2 | 8/2007 |

OTHER PUBLICATIONS

Search report issued in corresponding PCT application No. PCT/CN2010/071510, dated Jul. 1, 2010; total 6 pages.

(Continued)

*Primary Examiner*—Edward Tso
(74) *Attorney, Agent, or Firm*—Huawei Technologies Co., Ltd.

(57) ABSTRACT

A hot spot device includes an embedded processing module, a network connection module, and a terminal connection module. The embedded processing module controls the network connection module to connect to Internet, and also controls the network connection module to communicate with the terminal connection module. The terminal connection module includes a station (STA) chip and a first antenna. The STA chip receives from the embedded processing module data information obtained from the Internet through the network connection module, processes the data information, and transmits the data information to a certain area through the first antenna, so as to realize wireless signal coverage in the area. The STA chip also receives data information transmitted by wireless local area network (WLAN) equipment from the first antenna, processes the data information, outputs the processed data information to the embedded processing module for sending the processed data information to the Internet through the embedded processing module and network connection module.

13 Claims, 6 Drawing Sheets

OTHER PUBLICATIONS

Written opinion issued in corresponding PCT application No. PCT/CN2010/071510, dated Jul. 1, 2010; and English translation thereof; total 10 pages.

Office action issued in corresponding Chinese patent application No. 200910141039.4, dated Mar. 12, 2010; and English translation thereof; total 9 pages.

Weiwei Zhang: "Research and Design of a Wireless Access Point", dated Mar. 2006; total 22 pages.

Yi Liu: "Application and Design of a Wireless Indoor AP", dated Jan. 9, 2008; total 9 pages.

Anonymous: "Cradlepoint introduces battery powered personal WiFi Hotspot", XP002593935, dated Dec. 4, 2007, total 2 pages.

Cradlepoint: "PH300 - 3G/4G personal WiFi Hotspot - Datasheet", XO002593936, dated Jul. 26, 2010, total 2 pages.

Search report issued in corresponding European patent application No. EP10160387.6, dated Sep. 3, 2010; total 10 pages.

* cited by examiner

HOT SPOT DEVICE

CROSS-REFERENCE TO RELATED APPLICATIONS

This application is a continuation of International Application No. PCT/CN2010/071510, filed on Apr. 1, 2010, which claims priority to Chinese Patent Application No. 200910141039.4, filed on May 12, 2009. Both of the applications are hereby incorporated by reference in their entireties.

FIELD OF THE TECHNOLOGY

The present invention relates generally to the field of communication technologies, and more particularly to a hot spot device.

BACKGROUND OF THE INVENTION

With the ongoing development of the science and technology, the Internet has become one of the indispensable information exchange platforms for people.

A hot spot device is an electronic device capable of realizing wireless signal coverage for the Internet access in a certain area. In the area where the wireless signal coverage for the Internet access is realized, wireless local area network (WLAN) equipment (or referred to as WLAN handheld equipment), such as cellular phones, palmtop computers, and notebook computers can communicate with the hot spot device, and they can be connected to the Internet through the hot spot device, thus realizing the Internet access function.

Currently, common hot spot devices are mainly wireless routing gateways, such as the device 1 as shown in FIG. 1, which includes a network connection module, a router chip, a terminal connection module, and an external power source. The router chip may control the network connection module to connect to the Internet through a network cable 3 (broadband), and may control the terminal connection module to communicate with external information processing equipment such as a computer 2, so that the external information processing equipment is connected to the Internet. The external power source supplies electric energy for the network connection module, the router chip, and the terminal connection module through an external power source adapter 4.

The hot spot device may be connected to the external information processing equipment, such as the computer 2, through the network cable 3 as shown in FIG. 1, or it may also, through the terminal connection module, realize the wireless signal coverage of the Internet in a certain area, such that other computers 2 in the wireless signal coverage area can be connected to the Internet through the hot spot device.

A wireless routing gateway is usually placed at a position close to an Internet user. The wireless routing gateway connected to the Internet may realize the wireless signal coverage in an area required by the Internet user. Within a range of 10 meters to 100 meters from the wireless routing gateway, the user only needs to bring a notebook computer or a personal digital assistant (PDA) supporting the wireless signals into the range and be connect to the Internet, so as to access the Internet.

In the implementation of the present invention, the inventor finds that although the hot spot devices in the prior art are more or less able to realize the wireless signal coverage for the Internet in a certain area, at least the following problems exist.

Router chips in the prior art have a relatively high power-consumption rate and a large volume. Thus, the wireless routing gateways usually need an external power supply, such that the wireless routing gateways can normally only be placed at a position close to the Internet user. Also, the router chips in the prior art have a relatively high cost.

SUMMARY OF THE INVENTION

The present invention is directed to a hot spot device. A purpose of the present invention is to provide a hot spot device that solves the above-mentioned technical problems of the router chip having a relatively high power-consumption rate, a relatively large volume, and a relatively high cost.

In order to achieve the purpose, embodiments of the present invention provide the following technical solutions.

A hot spot device includes an embedded processing module, a network connection module, and a terminal connection module.

The embedded processing module is configured to control the network connection module to connect with the Internet, and control the network connection module to communicate with the terminal connection module.

The terminal connection module includes a station (STA) chip and a first antenna. In which:

The STA chip is configured to receive data information obtained by the embedded processing module from the Internet through the network connection module, process the data information, and control the first antenna to transmit the data information in a certain area, so as to realize wireless signal coverage of the Internet in the area.

The STA chip is further configured to receive data information in a wireless signal format transmitted by wireless local area network (WLAN) equipment in the area through the first antenna, process the data information, and output the processed data information to the embedded processing module for sending to the Internet through the embedded processing module and the network connection module.

Comparing with the prior art, the technical solution provided in the present invention has the following technical effects.

In the embodiments of the present invention, the embedded processing module and the STA chip are utilized to realize the functions of the router chip in the prior art. The embedded processing module and the STA chip can be made with a relatively low cost and have a very small size. Further, the embedded processing module and the STA chip have a low power-consumption rate and thus being power saving. Therefore, the technical problems that the prior art hot spot devices with router chips have, i.e. relatively high power consumption rate, the relatively large volume, and the relatively high cost, are solved by the present invention.

Meanwhile, as the present invention has the foregoing advantages, a portable power source may also be adopted to supply electric energy for the hot spot device, such that the portability of the hot spot device is enhanced.

BRIEF DESCRIPTION OF THE DRAWINGS

To illustrate the technical solutions according to the embodiments of the present invention or in the prior art more clearly, the accompanying drawings are provided. Following is a brief description of the drawings. Apparently, depicted in the accompanying drawings are only some embodiments of the present invention. Persons of ordinary skill in the art can derive other drawings from the accompanying drawings without creative efforts.

DETAILED DESCRIPTION OF THE EMBODIMENTS

The technical solutions of the present invention will be clearly and thoroughly described in the following with reference to the accompanying drawings. It is obvious that the embodiments to be described are only a part rather than all of the embodiments of the present invention. All other embodiments obtained by persons of ordinary skill in the art based on the embodiments in the specification without creative efforts shall fall within the protection scope of the present invention.

The present invention provides a portable and power saving hot spot device. The hot spot device is capable of providing wireless signal coverage in an area at any time and any place required by an Internet user.

Figure 1:
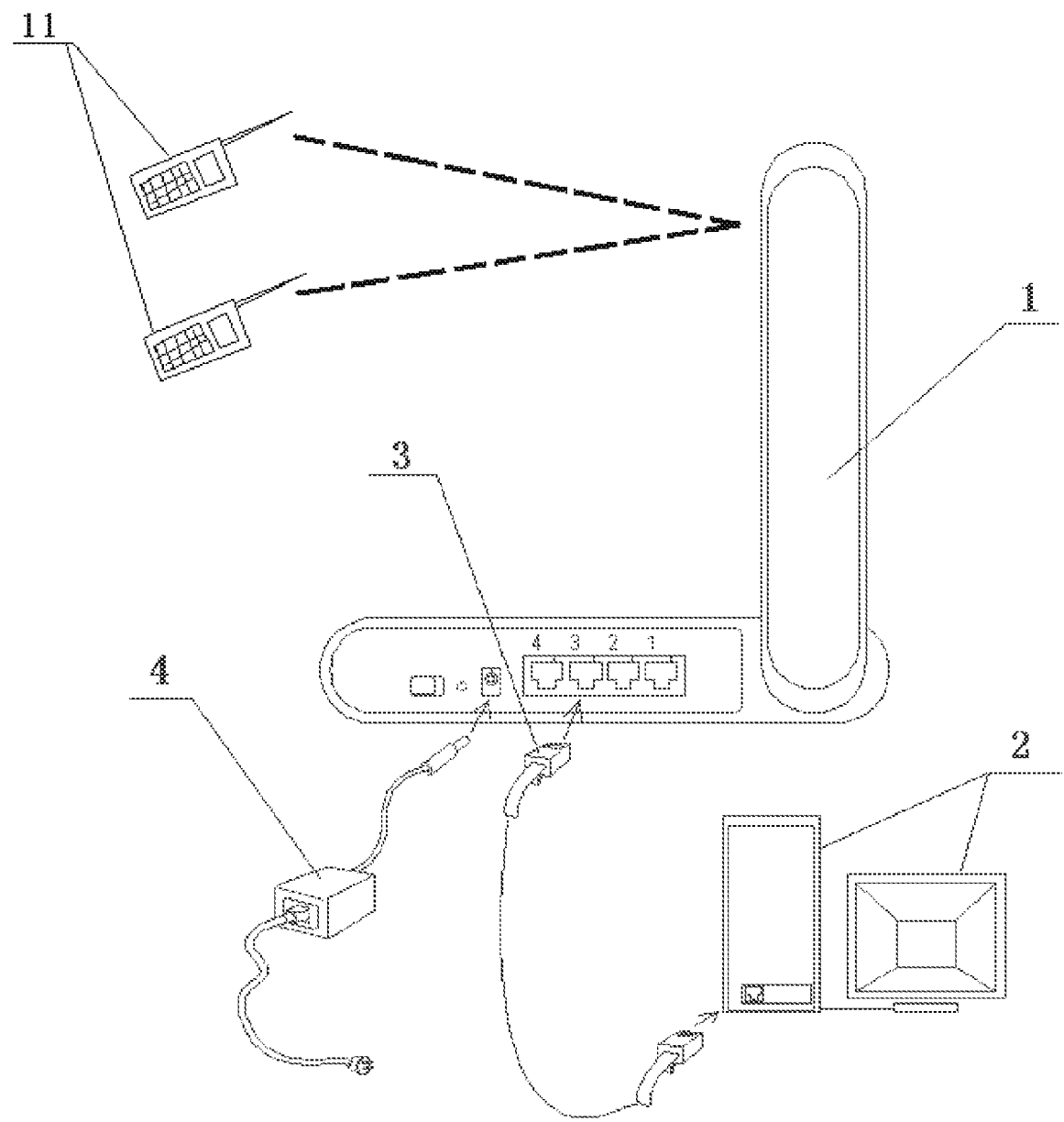
FIG. 1 is a schematic view of connection relationships between a hot spot device in the prior art and a computer and between the hot spot device and WLAN equipment.
Figure 2:
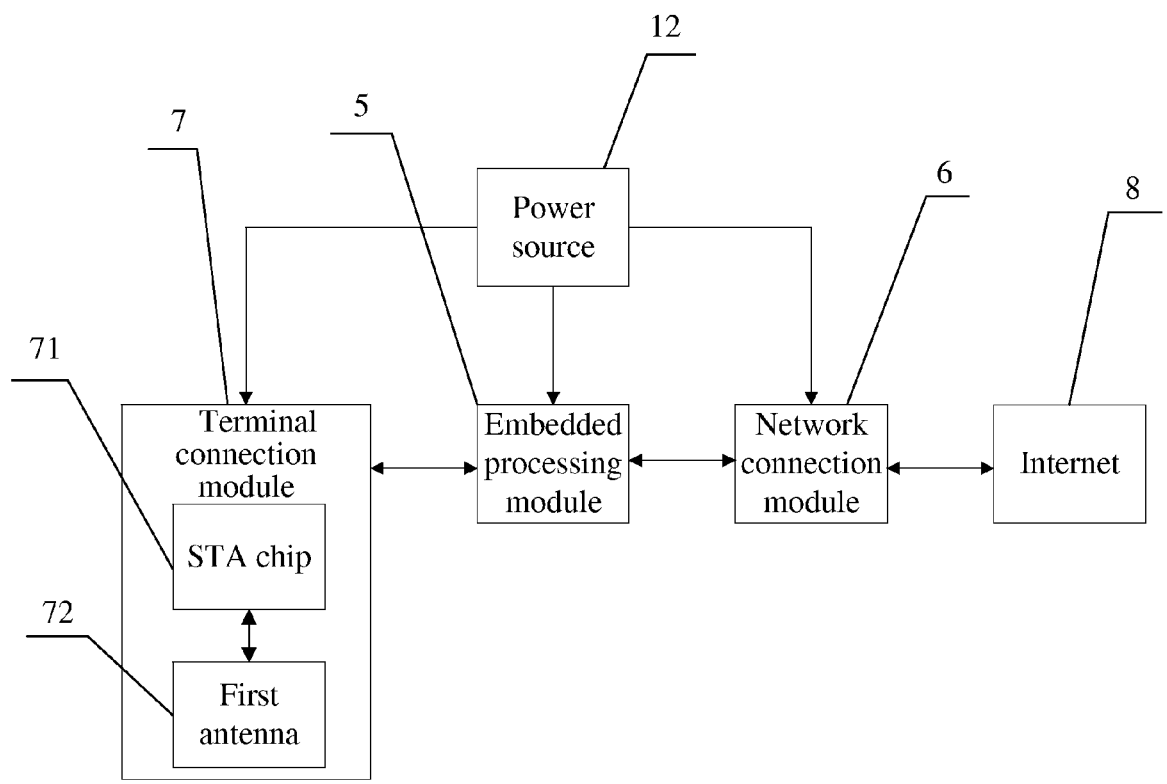
FIG. 2 is a block diagram of an internal structure of a hot spot device according to an embodiment of the present invention.
Figure 3:
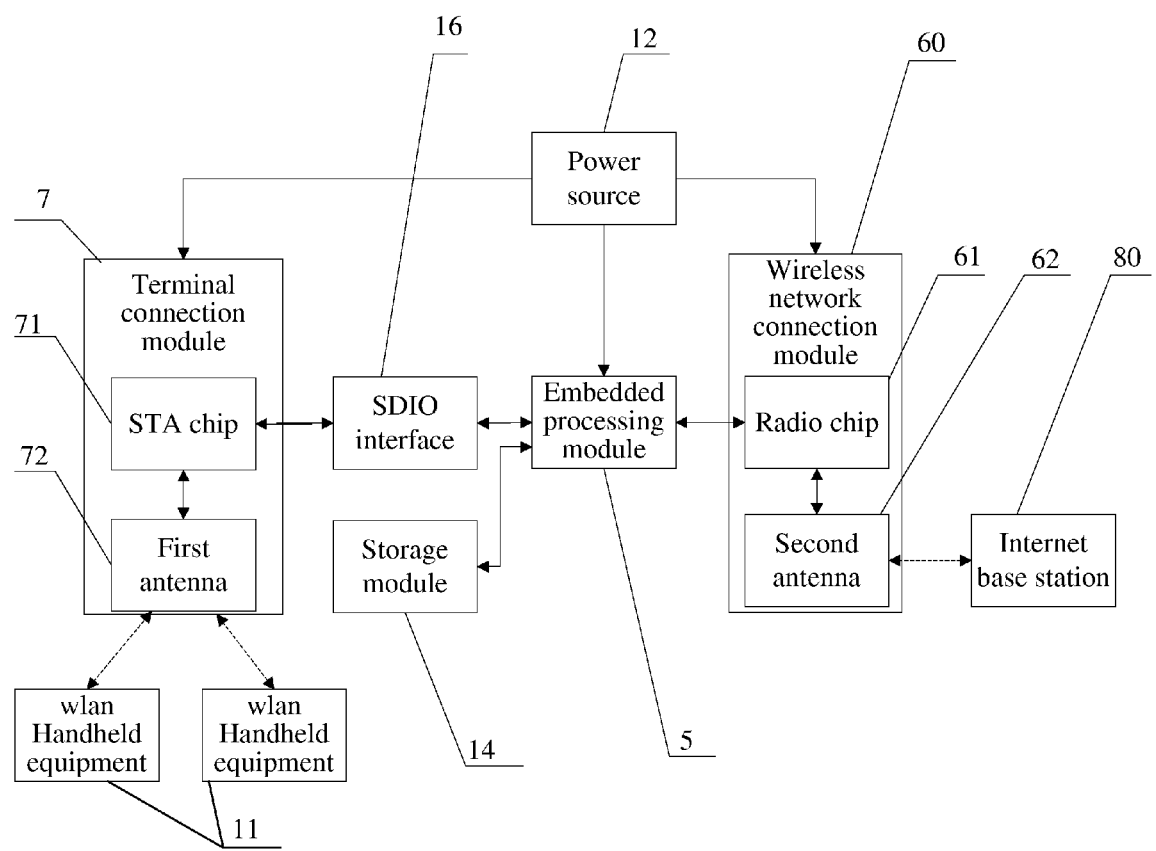
FIG. 3 is a block diagram of an implementation manner of the hot spot device according to an embodiment of the present invention.

Referring now to FIGS. 2 and 3, the hot spot device according to an embodiment of the present invention includes an embedded processing module 5, a network connection module 6, and a terminal connection module 7.

The embedded processing module 5 is configured to control the network connection module 6 to connect to the Internet 8, and control the network connection module 6 to communicate with the terminal connection module 7.

The terminal connection module 7 includes an STA chip 71 and a first antenna 72.

The STA chip 71 is configured to receive from the embedded processing module 5 data information obtained from Internet 8 through the network connection module 6, process the data information, and control the first antenna 72 to transmit the processed data information in a certain area, so as to realize the wireless signal coverage of the Internet 8 in the area.

The STA chip 71 is further configured to receive, through the first antenna 72, data information in a wireless signal format transmitted by WLAN equipment 11 in the area of the wireless signal coverage, process the data information, and output the data information to the embedded processing module 5 for sending the data information to the Internet 8 through the embedded processing module 5 and the network connection module 6.

In the present invention, the embedded processing module 5 and STA chip 71 are utilized to realize the functions of the router chip in the prior art. The embedded processing module 5 and STA chip 71 can be made with a relatively low cost and have a very small size. Further, the embedded processing module 5 and the STA chip 71 have a low power consumption rate and thus being power saving. Therefore, the technical problem that the router chips in the prior art hot spot devices have a high power consumption rate, a large volume and a high cost is solved by the solution provided by the present invention.

Meanwhile, as the embodiment of the present invention has the foregoing advantages, a portable power source 12 may also be adopted to supply electric energy for the hot spot device according to the present invention, so as to enhance the portability of the hot spot device according to the present invention.

In this embodiment, the embedded processing module 5 may be a 3rd generation (3G) baseband chip, and the first antenna 72 may be a WLAN antenna.

Figure 6:
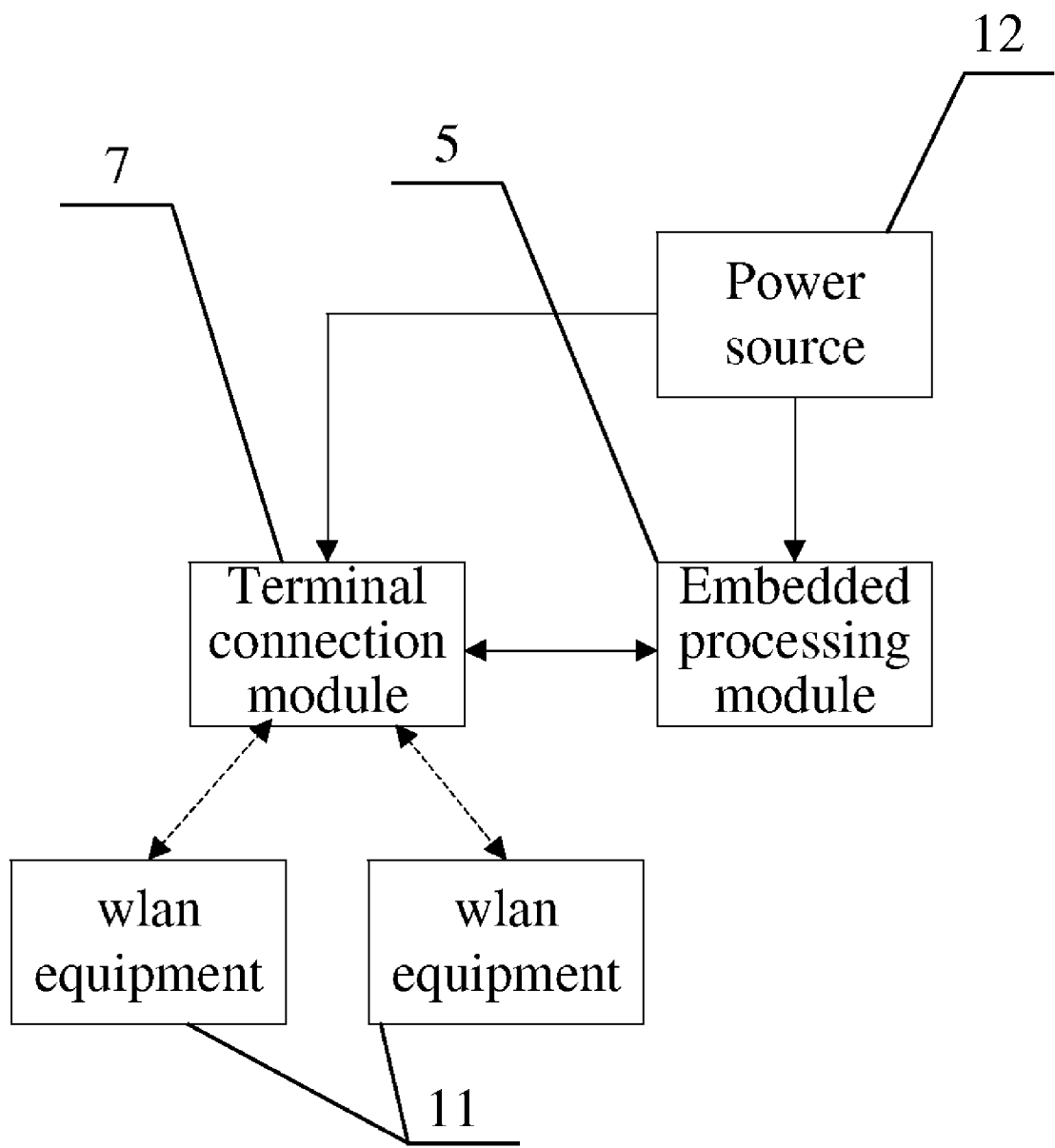
FIG. 6 is a block diagram of all internal modules at a work state when the hot spot device according to an embodiment of the present invention only supports a communication between WLAN equipment.

Referring now to FIG. 6, at least two pieces of WLAN equipment 11 may be connected to the terminal connection module 7. The embedded processing module 5 is further configured to control the terminal connection module 7 to transfer data between the WLAN equipment 11, so as to realize a communication between the WLAN equipment 11. The communication between the WLAN equipment 11 may be realized without the Internet 8, and the data transmission between the WLAN equipment 11 may be directly realized through the terminal connection module 7.

The network connection module 6 may be a wireless network connection module 60 (see FIG. 3), a wired network connection module, or both.

The wireless network connection module 60 is configured to communicate with an Internet base station 80 through a wireless signal, and connect to the Internet 8 through the Internet base station 80.

The wired network connection module is configured to connect to the Internet 8 through a broadband cable or a telephone line.

In this embodiment, the network connection module 6 may be connected to the Internet 8 through the wireless signal, and may also be connected to the Internet 8 through the broadband cable or the telephone line.

The wireless network connection module 60 includes a radio chip 61 and a second antenna 62.

The second antenna 62 communicates with the Internet base station 80 by transmitting or receiving the data information in the wireless signal format.

The radio chip 61 is configured to receive the data information from the embedded processing module 5, process the data information, transmit the data information to the Internet base station 80 through the second antenna 62, receive the data information in the wireless signal format transmitted by the Internet base station 80 through the second antenna 62, process the data information, and output the processed data information to the embedded processing module 5.

The radio chip 61 is a basis for a wireless system. The radio chip 61 may process the data information into the data information in the wireless signal format, and transmit the processed data information to the Internet base station 80 through the antenna module 62. The radio chip 61 may also process the data information in the wireless signal format into a format capable of being recognized by the embedded processing module 5 and output the processed data information to the embedded processing module 5.

In this embodiment, the second antenna 62 may be a 3G antenna. As known to persons skilled in the art, the 3G antenna has a simple frequency planning and a desirable data sending capability.

The hot spot device further includes a storage module 14 comprising a storage medium configured to store a soft access point (soft AP) software program. The embedded processing module 5 is configured to load the soft AP software program in the storage module 14 to the STA chip 71, and drive the STA chip 71 through the soft AP software program. The STA chip 71 in the prior art cannot, by itself, communicate with a plurality of WLAN equipment devices, and it cannot, at the same time, support a connection of the plurality of WLAN equipment devices. In the embodiment of the present invention, the soft AP software is downloaded or loaded for the STA chip 71, such that the STA chip 71 is driven through the soft AP software program. After the STA chip 71 is driven, the STA chip 71 may communicate with the plurality of WLAN equipment devices and support the connection of the plurality of WLAN equipment devices at the same time.

In this embodiment, the storage module 14 may be a multi chip package (MCP) chip. The MCP has a relatively high integrity and can integrate a flash memory with a random-access memory (RAM).

Figure 5:
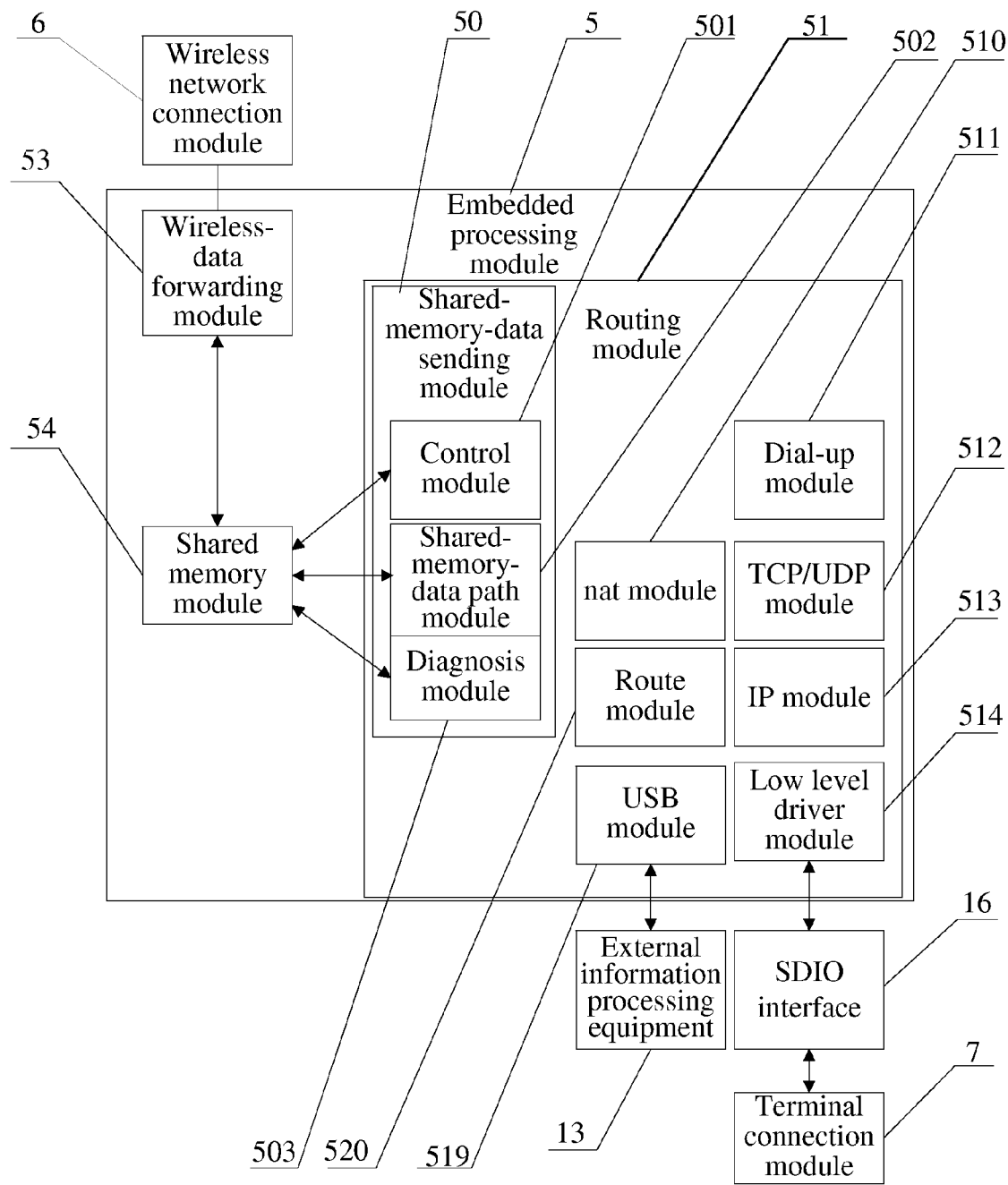
FIG. 5 is a block diagram of connection relations of all modules inside a main control module and connection relations between the modules and a wireless network connection module, a terminal connection module, and external information processing equipment in the hot spot device according to an embodiment of the present invention.

Referring to FIG. 5, the embedded processing module 5 includes a wireless-data forwarding module 53, a routing module 51, and a shared memory module 54.

The shared memory module 54 is configured to store data interacted between the wireless-data forwarding module 53 and the routing module 51.

The wireless-data forwarding module 53 is configured to establish a data forwarding path between the radio chip 61 and the routing module 51 through the shared memory module 54.

The routing module 51 is not only configured to communicate with the STA chip 71, but also configured to communicate with the radio chip 61 through the shared memory module 54.

In this embodiment, the embedded processing module 5 may be a dual core chip. The wireless-data forwarding module 53 and the routing module 51 may be separately disposed on two different processor cores of the dual core chip. Of course, in this embodiment, the embedded processing module 5 may also be a single-core chip.

The shared memory module 54 may be a virtual dual port RAM type shared memory. The virtual dual port RAM type shared memory may be realized through software. By omitting hardware, the software dual port RAM may have a lower cost. Of course, in this embodiment, the shared memory module 54 may also be a hardware dual port RAM.

Referring to FIG. 5, the routing module 51 and the STA chip 71 communicate with each other through a secure digital input output (SDIO) interface 16. The SDIO interface 16 is a peripheral interface defined based on an secure digital (SD) standard. The SDIO interface 16 has a low power consumption rate and is power saving. Of course, the embedded processing module 5 and the STA chip 71 may also communicate with each other through a universal serial bus (USB) interface or other data transmission interfaces.

The routing module 51 includes a low level driver module 514, an Internet protocol (IP) module 513, a network address translation (NAT) module 510, a route (sending) module 520, a transfer control protocol (TCP)/user datagram protocol (UDP) module 512, a dial-up module 511, and a shared-memory-data sending module 50.

The low level driver module 514 is configured to drive a physical interface for transmitting the data between the IP module 513 and the STA chip 71.

The IP module 513 may receive data from the STA chip 71 through the low level driver module 514, encapsulate the data into an IP package format, and send the IP package to the route module 520. Alternatively, the IP module 513 may also obtain the data in the IP package format from the route module 520, convert the data into a format capable of being recognized by the low level driver module 514, and send the data to the STA chip 71 through the low level driver module 514.

The NAT module 510 is configured to perform a conversion between an address of the WLAN equipment 11 and an address of the Internet 8.

The route module 520 matches an address for the data in the IP package format according to a routing structure of the data in the IP package format received from the IP module 513 and an address assigned by the NAT module 510, and forwards the data.

The TCP/UDP module 512 is configured to identify data required by the WLAN equipment 11 communicating with the STA chip 71, and cooperate with the NAT module 510 to identify a data transmission address corresponding to the WLAN equipment 11.

The dial-up module 511 is configured to establish a data transmission channel between the route module 520 and the Internet base station 80 in a dial-up manner.

The shared-memory-data sending module 50 is configured to send the data information to the wireless-data forwarding module 53 through the shared memory module 54, read the data information from the wireless-data forwarding module 53 through the shared memory module 54, and output the data information to the route module 520.

In this embodiment, the shared-memory-data sending module 50 includes a shared-memory-data path module 502, a control module 501, and a diagnosis module 503.

The shared-memory-data path module 502 is configured to transmit the data between the shared memory module 54 and the route module 520.

The control module 501 is configured to establish and maintain a data transmission channel on the shared-memory-data path module 502.

The diagnosis module 503 is configured to receive information related to the wireless-data forwarding module 53 from the shared memory module 54, test whether the wireless-data forwarding module 53 works normally, and send the test result to the external information processing equipment 13 through a USB module 519.

The external information processing equipment 13 is operated by locally installed diagnosis software, which is configured to read test data sent from the USB module 519 and display the test data on a window to notify an operator.

The hot spot device according to the embodiment of the present invention further includes a USB module 519. The USB module 519 is electrically connected to the external information processing equipment 13 in a plug-in manner. The routing module 51 is further configured to communicate with the external information processing equipment 13 through the USB module 519. The USB module 519 can transmit the data between the external information processing equipment 13 and the routing module 51. Of course, in this embodiment, the routing module 51 may also be electrically connected to the external information processing equipment 13 through other hardware means.

Figure 4:
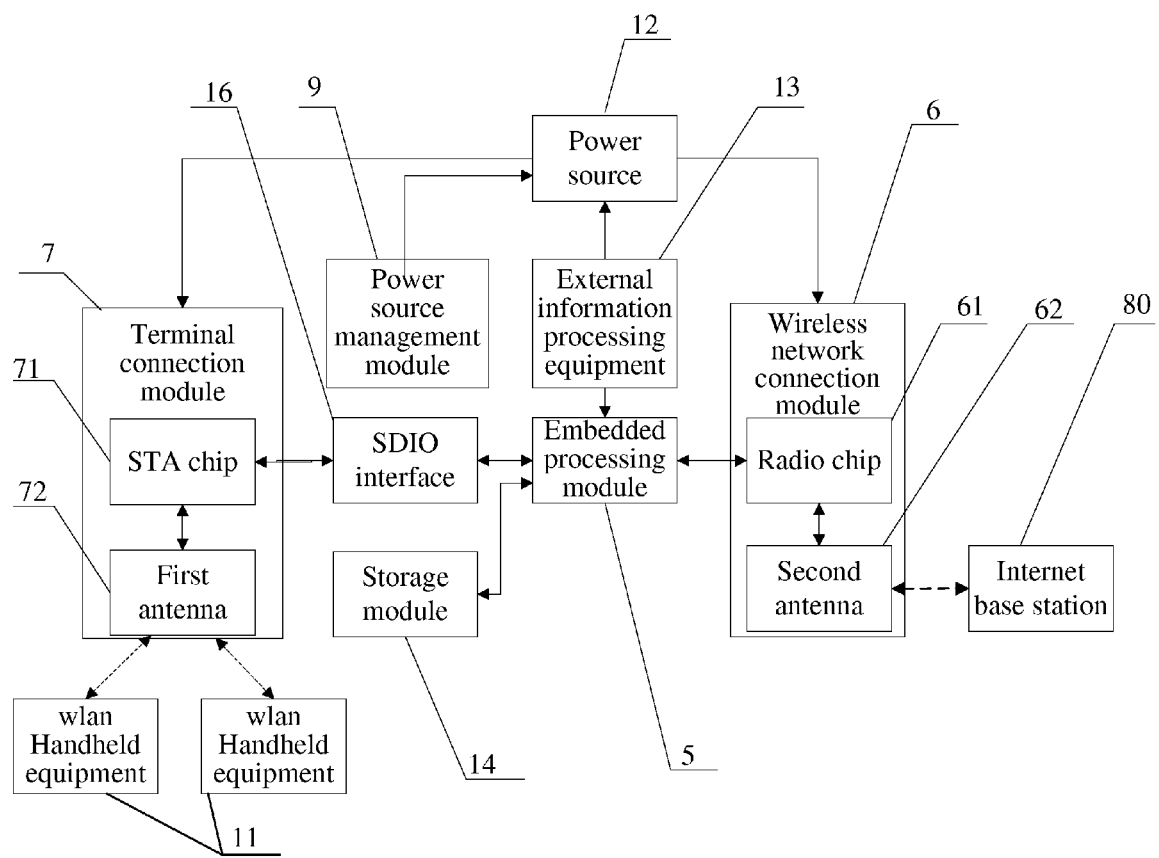
FIG. 4 is a block diagram of another implementation manner of the hot spot device according to an embodiment of the present invention.

Referring to FIG. 4 together with FIG. 5, the hot spot device further includes a power source management module 9. The power source management module 9 is configured to control the power source 12 to supply electric energy of a suitable voltage and\or current for the network connection module 6, the embedded processing module 5, and the terminal connection module 7.

The power source 12 may be a portable power source, and is preferably a rechargeable battery. The power source management module 9 is further configured to control the USB module 519 to obtain the electric energy from the external information processing equipment 13 and recharge the power source 12.

When the hot spot device according to the embodiment of the present invention is connected to the external information processing equipment 13, the power source management module 9 is configured to control the USB module 519 to obtain the electric energy from the external information processing equipment 13 and recharge the power source 12. Here, the power source 12 or the external information processing equipment 13 may supply the electric energy for the network connection module 6, the embedded processing module 5, and the terminal connection module 7.

In this embodiment, the external information processing equipment 13 may be a notebook computer, a desktop computer, wireless fidelity (wi-fi) equipment, or WLAN authentication and privacy infrastructure (WAPI) equipment. The common wi-fi equipment includes a smart phone, a digital camera with a wi-fi function, a handheld electronic game player, such as a play station portable (PSP), and a moving pictures experts group (MPEG) audio layer 3 (MP3) or MP4 player, such as an IPOD TOUCH (IPOD player).

As the notebook computer and the wi-fi equipment are easy to be carried together with the hot spot device according to the present invention, it is more convenient to use the notebook computer and the wi-fi equipment together with the hot spot device according to the present invention.

The above are merely some specific embodiments of the present invention, and they are not intended to limit the scope of the present invention. Any variation or replacement easily occurred to any person skilled in the art as well as embodiments formed by recombining various technical features in the embodiments without departing from the scope of the present invention should fall within the scope of the present invention as defined by the appended claims.

What is claimed is:

1. A hot spot device for providing wireless Internet access, comprising an embedded processing module, a network connection module, and a terminal connection module, wherein:
   the embedded processing module is configured to control a network connection between the network connection module and the Internet, and to control communications between the network connection module and the terminal connection module;
   the terminal connection module comprises a station (STA) chip and a first antenna, wherein:
   the STA chip is configured to receive data information from the embedded processing module, the data information being obtained from the Internet by the embedded processing module through the network connection module, process the data information, and transmit the processed data information in a certain area through the first antenna, so as to realize a wireless signal coverage of the Internet in the area; and
   the STA chip is further configured to receive, through the first antenna, data information in a wireless signal format transmitted by one or more wireless local area network (WLAN) equipment devices in the area of the wireless signal coverage, process the data information, output the data information to the embedded processing module for sending the data information to the Internet through the embedded processing module and the network connection module.

2. The hot spot device according to claim 1, wherein at least two WLAN equipment devices are connected to the terminal connection module, and the embedded processing module is further configured to control the terminal connection module to transmit data between the WLAN equipment devices, so as to realize a communication between the WLAN equipment devices.

3. The hot spot device according to claim 1, wherein the network connection module comprises a wireless network connection module and/or a wired network connection module;
   the wireless network connection module is configured to communicate with an Internet base station through a wireless signal and is connected to the Internet through the Internet base station, and
   the wired network connection module is configured to connect to the Internet through a broadband cable or a telephone line.

4. The hot spot device according to claim 3, wherein the wireless network connection module comprises a radio chip and a second antenna, and wherein:
   the second antenna is configured to communicate with the Internet base station by transmitting or receiving the data information in the wireless signal format, and
   the radio chip is configured to:
   receive the data information from the embedded processing module, process the data information, transmit the processed data information to the Internet base station through the second antenna, or
   receive, through the second antenna, the data information in the wireless signal format transmitted by the Internet base station, process the data information, and output the processed data information to the embedded processing module.

5. The hot spot device according to claims 1, further comprising a storage module configured to store a soft access point (soft AP) software program, wherein the embedded processing module is further configured to load the soft AP software program in the storage module to the STA chip, and drive the STA chip through the soft AP software program.

6. The hot spot device according to claim 5, wherein the storage module is a multi chip package (MCP) chip.

7. The hot spot device according to claim 1, wherein the embedded processing module comprises a wireless-data forwarding module, a routing module, and a shared memory module; and wherein:
   the shared memory module is configured to store data interacted between the wireless-data forwarding module and the routing module;
   the wireless-data forwarding module is configured to establish a data forwarding path between a radio chip in a wireless connection module and the routing module through the shared memory module, and
   the routing module is configured to communicate with the STA chip, and communicate with the radio chip through the shared memory module.

8. The hot spot device according to claim 7, wherein the shared memory module is a virtual dual port random-access memory (RAM) type shared memory.

9. The hot spot device according to claim 7, wherein the routing module and the STA chip communicate with each other through a secure digital input output (SDIO) interface.

10. The hot spot device according to claims 7, wherein the routing module comprises a low level driver module, an Interface protocol (IP) module, a network address translation (NAT) module, a route module, a transfer control protocol (TCP)/user datagram protocol (UDP) module, a dial-up module, and a shared-memory-data sending module;

the low level driver module is configured to drive a physical interface for transmitting the data between the IP module and the STA chip;

the IP module is configured to receive the data from the STA chip through the low level driver module, encapsulate the data into an IP package format, send the IP package to the route module, obtain the data in the IP package format from the route module, convert the IP package format into a format capable of being recognized by the low level driver module, and send the data in the format to the STA chip through the low level driver module;

the NAT module is configured to perform a conversion between an address of the WLAN equipment and an address of the Internet;

the route module is configured to match an address for the data in the IP package format according to a routing structure of the data in the IP package format received from the IP module and an address assigned by the NAT module, and forward the data;

the TCP/UDP module is configured to identify the data required by the WLAN equipment communicating with the STA chip, and cooperate with the NAT module to identify a data transmission address corresponding to the WLAN equipment;

the dial-up module is configured to establish a data transmission channel between the route module and the Internet base station in a dial-up manner, and the shared-memory-data sending module is configured to send the data information to the wireless-data forwarding module through the shared memory module, read the data information from the wireless-data forwarding module through the shared memory module, and input the data information to the route module.

11. The hot spot device according to claim 10, wherein the shared-memory-data sending module comprises a shared-memory-data path module, a control module, and a diagnosis module;

the shared-memory-data path module is configured to transmit the data between the shared memory module and the route module;

the control module is configured to establish and maintain a data transmission channel on the shared-memory-data path module; and the diagnosis module is configured to receive information related to the wireless-data forwarding module from the shared memory module, test whether the wireless-data forwarding module normally works, and send a test result to external information processing equipment through a universal serial bus (USB) module.

12. The hot spot device according to claim 7, further comprising a USB module, wherein the USB module is electrically connected to an external information processing device in a plug-in manner, and the routing module is further configured to communicate with the external information processing device through the USB module.

13. The hot spot device according to claim 12, further comprising a power source management module for managing a power source, wherein the power source is a rechargeable battery, the power source management module is configured to control the power source to supply electric energy of a suitable voltage and/or current for the wireless network connection module, the embedded processing module, and the terminal connection module, and the power source management module is further configured to control the USB module to obtain electric energy from the external information processing device and recharge the power source.

* * * * *